Feb. 5, 1946. E. A. I. ORRMELL 2,394,256
METHOD OF SEPARATING FIBROUS BOARDS FROM THEIR SUPPORTING MEMBERS
Filed Feb. 8, 1943
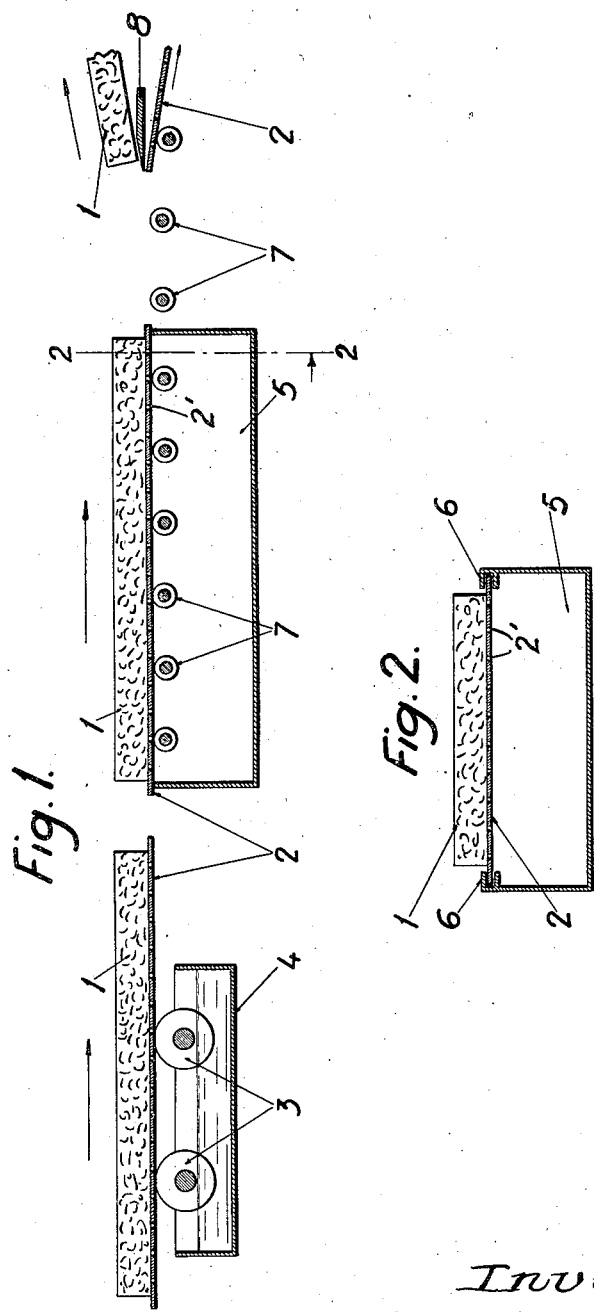
Inventor
E. A. I. Orrmell Patented Feb. 5, 1946

2,394,256

UNITED STATES PATENT OFFICE 2,394,256

METHOD OF SEPARATING FIBROUS BOARDS FROM THEIR SUPPORTING MEMBERS

Ernst Aron Isidor Orrmell, Kramfors, Sweden, assignor to Svenska Cellulosa Aktiebolaget, Stockholm, Sweden, a joint-stock company of Sweden Application February 8, 1943, Serial No. 475,218
In Sweden December 31, 1941

1 Claim. (Cl. 92—54).

In producing boards of fibrous material and a suitable foam forming agent, such as sulphite waste liquor, the mass is cast in moulds, the bottom of which consists of a supporting member provided with liquid outflow apertures, such as a perforated plate. When the mass has dried and the mould walls have been removed the formed board is to be separated from the supporting member which, however, meets with great difficulties since the board is retained thereby that liquid drops passing through the apertures have congealed or, through evaporation, have finally formed small lumps of binding agent on the underside of the supporting member, said lumps sticking to the underside of the supporting member around the apertures and preventing the separation of the board. The board sticks also to the upper side of the supporting member. The fact that the fibrous boards stick to the supporting members means in itself an advantage because the boards are thus held stretched and are prevented from warping during the drying.

The present invention relates to a method of facilitating the separation of the board from its supporting member after the drying. The invention consists substantially therein that the underside of the supporting member is wetted to remove the portions projecting through the apertures and sticking to the said underside, whereby liquid also penetrates upward through the apertures of the supporting member and tends to spread between the upper side thereof and the board, and that the underside of the supporting member is then subjected to an overpressure in a container, said overpressure through the apertures of the supporting member being caused to act upon the board and tending to raise the same from the supporting member.

The accompanying drawing illustrates diagrammatically how the method is carried out.

Fig. 1 shows a lateral view of a device with which the method is carried out. Fig. 2 shows a cross section through the pressure container in this device on line 2—2 of Fig. 1.

On the drawing the fibrous boards 1 are shown on their supporting members after the drying has been carried out and the mould walls have been removed. Said supporting members consist of perforated plates 2. After the drying, which takes place in a known way, the fibrous boards 1 are brought to the wetting device which may consist of one or more rotatable rollers 3 cooperating with the underside of the plates. Said rollers are preferably coated with felt or the like and enter a container 4 preferably containing hot water or other suitable liquid. Rotatable brushes or the like may of course be used instead of rollers. When the rollers work against the underside of the plate 2 the previously mentioned lumps on the underside of the plates are removed, whereby the liquid supplied by the rollers also penetrates upward through the apertures 2' of the plate and, due to adhesion or capillary action, spread between the fibrous board and the upper side of the plate, so that the binding agent is dissolved and the sticking is neutralized.

The plates 2 with boards are transported in a suitable way from the wetting device to a pressure container 5 in which a suitably adjusted overpressure can be generated below the plate 2, preferably thereby that, when the plate with the board located thereon has been brought to the container, hot air under suitable pressure is supplied by means of a fan device whereby the wet underside of the plate rapidly dries. When the underside of the plate is subjected to the overpressure the plate will be pressed upward and at the edges tighten against a flange 6 on the container (Fig. 2). Through the apertures 2' of the plate 2 the overpressure generated in the container acts upon the board 1 and tends to raise the same from the plate, so that the board loosens at the apertures. Then the plate with the board is discharged from the container by suitable transport members 7 adapted to cooperate with the underside of the plate, and is caused to cooperate with a knife 8 or other separating device which finally separates the board from the plate.

By the invention it is in the production of the boards possible to utilize, in an increased quantity, the binding agent contained in sulphite waste liquor and thereby obtain a more solid board material without running the risk that the resulting stronger sticking of the board on the plate offers any difficulties at the separation.

Having now described my invention, what I claim as new and desire to secure by Letters Patent is:

A method of separating fibrous boards after drying from supporting members having liquid outflow apertures therethrough, including the steps of wetting the underside of the supporting member and removing those portions of the board projecting through the apertures while at the same time causing the penetration of the wetting liquid upwardly through the apertures so that it will spread out on the upper surface of the supporting member, then holding and subjecting the under surface of the supporting member to an air pressure which acts through the apertures against the underside of the board and tends to raise the board from the supporting member and finally exerting a scraping and lifting action between the upper surface of the supporting member and the lower surface of the board to remove the board from the supporting member.

ERNST ARON ISIDOR ORRMELL.